United States Patent Office 3,268,591
Patented August 23, 1966

3,268,591
PRODUCTION OF MONOMERIC FORMALDEHYDE
Kenneth T. Sloan, Garfield, and Richard E. Reynolds,
Midland Park, N.J., assignors, by mesne assignments,
to Tenneco Chemicals, Inc., a corporation of Delaware
No Drawing. Filed Apr. 1, 1963, Ser. No. 269,746
8 Claims. (Cl. 260—606)

This invention relates to the production of monomeric formaldehyde and, more particularly, to a process for the production of substantially anhydrous, gaseous, monomeric formaldehyde. The invention provides an improved process for the production of substantially anhydrous, gaseous, monomeric formaldehyde having a purity of at least 99.9 percent by weight from low molecular weight formaldehyde polymers.

The polymerization of monomeric formaldehyde to form high molecular weight thermoplastic polymers, which (after stabilization) may be fabricated into such shaped articles as films, fibers, sheets, and rods, requires the use of substantially anhydrous monomeric formaldehyde. Present process technology for manufacturing substantially anhydrous monomeric formaldehyde is based on the thermal depolymerization of a low molecular weight formaldehyde polymer followed by the removal of water, methanol, and other impurities from the monomeric formaldehyde. The purification of the monomeric formaldehyde has usually been done either by conveying the formaldehyde vapors through a series of traps maintained at low temperatures to freeze the impurities from the gas stream or by causing the water and other impurities to react with formaldehyde to form low molecular weight prepolymers which, in turn, are then removed from the reactor. The former method is obviously cumbersome and unsuited to the large-scale production of anhydrous monomeric formaldehyde, while the use of the latter method results in a lowered conversion of formaldehyde to its high molecular weight polymers.

Using a low molecular weight formaldehyde polymer as the starting material for monomeric formaldehyde, we have found that when this low molecular weight formaldehyde polymer is depolymerized in the presence of an alkylene dicarboxylate which is capable of reacting with water and the other impurities associated with the low molecular weight polyformaldehyde, it is possible simultaneously to depolymerize the low molecular weight polymer and to purify the resulting monomeric formaldehyde, thereby producing a substantially anhydrous, gaseous, monomeric formaldehyde suitable (without further purification) for polymerization to a high molecular weight polymer.

Although any alkylene dicarboxylate capable of reacting with water and the other impurities usually associated with low molecular weight polymers of formaldehyde may be used for the simultaneous depolymerization-purification medium in accordance with the invention, particularly satisfactory results have been obtained by using an alkylene dicarboxylate having a structure represented by the formula $$R'-\underset{\underset{O}{\|}}{C}-O-(RO)_n-\underset{\underset{O}{\|}}{C}-R''$$

in which R represents a divalent radical selected from the group consisting of

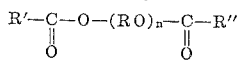

R' and R" each represent a radical selected from the group consisting of alkyl groups containing from 1 to 17 carbon atoms, cycloalkyl groups, and mononuclear and binuclear aryl groups, and n represents an integer from 1 to 3. The preferred alkylene dicarboxylates are those in which R represents a methylene group and R' and R" each represent an alkyl group containing from 1 to 3 carbon atoms, such as methylene diacetate, methylene dipropionate, methylene dibutyrate, methylene acetate butyrate, and low molecular weight polymeric analogs of these diesters (or dicarboxylates, the terms being interchangeably used), and mixtures of these compounds. By using such alkylene dicarboxylates as the depolymerization-purification medium, it is possible to produce substantially anhydrous, gaseous, monomeric formaldehyde having a purity of at least 99.9 percent by weight.

A preferred process according to this invention for producing substantially anhydrous, gaseous, monomeric formaldehyde suitable for polymerization to a high molecular weight polymer comprises (i) depolymerizing a low molecular weight polymer of formaldehyde by heating it in the presence of an alkylene dicarboxylate having a structure represented by the formula $$R'-\underset{\underset{O}{\|}}{C}-O-(RO)_n-\underset{\underset{O}{\|}}{C}-R''$$

in which R represents a divalent radical selected from the group consisting of

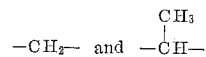

R' and R" each represent a radical selected from the group consisting of alkyl groups containing from 1 to 17 carbon atoms, cycloalkyl groups and mononuclear and binuclear aryl groups, and n represents an integer from 1 to 3, at a temperature in the range between the depolymerization temperature of the low molecular weight polymer of formaldehyde and the boiling point of the alkylene dicarboxylate, and (ii) recovering substantially anhydrous, gaseous, monomeric formaldehyde having a purity of at least 99.9 percent by weight from the depolymerization medium.

Any of the known low molecular weight formaldehyde polymers can be used as the source of monomeric formaldehyde in the process of the present invention. These include, for example, trioxane, paraformaldehyde, α-polyoxymethylene, and β-polyoxymethylene. Although polymers that contain as much as 5 percent by weight of water, formic acid, methanol, methyl formate, methylal, and other impurities may be used in the process of the invention, we have obtained particularly satisfactory results by employing α-polyoxymethylene or another polymer that contains a relatively small amount of the aforementioned impurities, such as the polyoxymethylene glycols having an average molecular weight in the range between 2,000 to about 6,000 and containing less than 0.1 percent by weight of water. These polyoxymethylene glycols, which are described more fully in the copending application of Harry Yakimik, Jr., et al., Serial No. 266,191, filed March 19, 1963, can be prepared by treating an aqueous formaldehyde solution with a small amount of alkali, heating the resulting solution to a temperature above the depolymerization temperature of paraformaldehyde, and then slowly cooling the solution at a uniform rate to ambient room temperature, thereby selectively crystallizing the polyoxymethylene glycol.

To insure complete and rapid depolymerization of the formaldehyde polymer and to prevent the formation in the condensers and other processing equipment of deposits of solid, low molecular weight formaldehyde prepolymers which might interfere with the operation of the process equipment and which might bring about a reduction in the yield of substantially pure monomeric formaldehyde, it is often desirable to incorporate a depolymerization catalyst in the alkylene dicarboxylate employed as the depolymerization-purification medium. Suitable depolymerization catalysts are non-volatile Lewis acids which are stable at the depolymerization temperature and which have ionization constants above approximately $1 \times 10^{-5}$. These catalysts include, for example, phosphoric acid, sulfuric acid, ethyl hydrogen sulfate, benzene sulfonic acid, tolyl dihydrogen phosphate, and ditolyl hydrogen phosphate. Only a catalytic amount of this acid, generally about 0.01 percent to 1 percent and preferably 0.1 percent to 0.5 percent by weight, based on the weight of the alkylene dicarboxylate, need be used.

The conversion of a low molecular weight formaldehyde polymer to substantially anhydrous, gaseous, monomeric formaldehyde in accordance with the process of this invention can be accomplished by any convenient manipulative procedure. For example, the low molecular weight formaldehyde polymer can be added continuously and at a substantially uniform rate to the alkylene dicarboxylate which is maintained at a temperature above the depolymerization temperature of the polymer, or a suspension of the polymer in the alkylene dicarboxylate can be heated to a temperature at which the polymer will depolymerize. Nor are the conditions critical under which the process is carried out, since atmospheric, subatmospheric, or superatmospheric pressure may be used. The depolymerization-purification process should be carried out, however, at a temperature between the depolymerization temperature of the low molecular weight formaldehyde polymer and the boiling point of the pure alkylene dicarboxylate. At atmospheric pressure, the process is usually carried out at a temperature in the range between about 130° C. to about 160° C.

The hot vapors that leave the reactor are cooled to condense any vapors of the alkylene dicarboxylate which are present in the gas stream, which may be done conveniently by passing the vapors through a water-cooled condenser. If desired, the gas stream can then be passed through one or more traps at a temperature of approximately 5° C. or lower to separate small amounts of formaldehyde prepolymer from the monomeric formaldehyde, but this subsequent cooling is frequently unnecessary. The product obtained contains more than 99.9 percent by weight, and in most cases more than 99.95 percent by weight of monomeric formaldehyde. To insure the the highest yields, the preparation of substantially pure monomeric formaldehyde in accordance with the process of the invention should be carried out under non-oxidizing conditions, which may be obtained easily by conducting the depolymerization-purification reaction under a blanket of an anhydrous inert gas, such as nitrogen.

The alkylene dicarboxylate as the depolymerization-purification medium can be readily regenerated and purified. This can be done by cooling the spent alkylene dicarboxylate to allow any residual formaldehyde to form a solid polymer which, in turn, may then be removed by filtration. This polymer can be recycled simply by adding it to the polymer which is fed into the reactor. The alkylene dicarboxylate, after the removal of the formaldehyde, contains small amounts of esters, acids, and other compounds which are associated with the low molecular weight formaldehyde polymer or which were formed by the reaction of the alkylene dicarboxylate with these impurities. The impure alkylene dicarboxylate need only be fractionally distilled, preferably under subatmospheric pressure, to yield a product which contains more than 98 percent by weight of the alkylene dicarboxylate and which can be reused in the depolymerization-purification process of this invention or in other reactions. In a preferred embodiment of the invention, small amounts of the spent alkylene dicarboxylate are withdrawn from the reactor during the depolymerization-purification step while equivalent amounts of fresh material are added simultaneously to the reactor. The spent material can then be purified by the aforementioned procedure and reused in the process.

The following examples are illustrative of the ease with which substantially anhydrous, gaseous, monomeric formaldehyde may be produced in accordance with the process of the invention:

*Example I*

One hundred grams of polyoxymethylene glycol which had an average molecular weight of 4100 and which contained 0.06 percent by weight of water was fed continuously over a period of 60 minutes into a reactor containing 570 grams of methylene diacetate maintained at a temperature of 140° C. to 160° C. The formaldehyde vapors which were evolved were passed through a water-cooled condenser and then through a trap maintained at 0° C. Chromatographic analysis of the product indicated that it contained more than 99.95 percent by weight of formaldehyde and only traces of methanol and water.

A small amount of formaldehyde polymer precipitated when the methylene diacetate was cooled to ambient temperature. After filtration, the methylene diacetate was distilled under 90–100 mm. absolute pressure to yield 542.5 grams of a fraction containing more than 98 percent by weight of methylene diacetate. Only a very small amount of formaldehyde prepolymer was formed in the condenser during this run.

*Example II*

One hundred grams of α-polyoxymethylene was fed continuously over a period of 55 minutes into a reactor to which 573 grams of methylene diacetate containing 0.36 percent by weight of phosphoric acid had been added. The methylene diacetate was maintained at 135°–160° C. during the addition of the α-polyoxymethylene. The formaldehyde vapors which were evolved were passed through a water-cooled condenser and then through a trap maintained at 0° C. Upon analysis, the gaseous product was found to contain more than 99.95 percent by weight of formaldehyde.

Only a very small amount of formaldehyde prepolymer was formed in the condenser, and no polymer precipitated when the reaction medium was cooled to ambient temperature.

At the end of the depolymerization-purification step, the reaction medium contained 92.5 percent by weight of methylene diacetate, 4.9 percent by weight of acetic acid, 0.5 percent by weight of acetic anhydride, and 2.1 percent by weight of unidentified materials. It was distilled under 90–100 mm. absolute pressure to yield a fraction containing more than 98 percent by weight of methylene diacetate.

We claim:

1. The process for producing substantially anhydrous, gaseous, monomeric formaldehyde suitable for polymerization to a high molecular weight polymer which comprises (i) depolymerizing a low molecular weight polymer of formaldehyde by heating it in the presence of methylene diacetate at a temperature in the range between the depolymerization temperature of the low molecular weight formaldehyde polymer and 160° C., and (ii) recovering substantially anhydrous, gaseous, monomeric formaldehyde having a purity of at least 99.9 percent by weight from the depolymerization medium.

2. The process for producing substantially anhydrous, gaseous, monomeric formaldehyde suitable for polymerization to a high molecular weight polymer which comprises (i) depolymerizing a low molecular weight polymer of formaldehyde by heating it in the presence of methylene diacetate at a temperature in the range between 130° C. and 160° C., and (ii) recovering substantially anhydrous, gaseous, monomeric formaldehyde having a purity of at least 99.9 percent by weight from the depolymerization medium.

3. The process for producing substantially anhydrous, gaseous, monomeric formaldehyde suitable for polymerization to a high molecular weight polymer which comprises (i) depolymerizing α-polyoxymethylene by heating it in the presence of methylene diacetate at a temperature in the range between 130° C. and 160° C., and (ii) recovering substantially anhydrous, gaseous, monomeric formaldehyde having a purity of at least 99.9 percent by weight from the depolymerization medium.

4. The process for producing substantially anhydrous, gaseous, monomeric formaldehyde suitable for polymerization to a high molecular weight polymer which comprises (i) depolymerizing a polyoxymethylene glycol having a molecular weight in the range from about 2,000 to about 6,000 and containing not more than 0.1 percent by weight of water by heating it in the presence of methylene diacetate at a temperature in the range between 130° C. and 160° C., and (ii) recovering substantially anhydrous, gaseous, monomeric formaldehyde having a purity of at least 99.9 percent by weight from the depolymerization medium.

5. The process for producing substantially anhydrous, gaseous, monomeric formaldehyde suitable for polymerization to a high molecular weight polymer which comprises (i) depolymerizing a low molecular weight polymer of formaldehyde by heating it in the presence of methylene diacetate containing a catalytic amount of a Lewis acid having an ionization constant in excess of about $1 \times 10^{-5}$, at a temperature in the range between 130° C. and 160° C., and (ii) recovering substantially anhydrous, gaseous, monomeric formaldehyde having a purity of at least 99.9 percent by weight from the depolymerization medium.

6. The process for producing substantially anhydrous, gaseous, monomeric formaldehyde suitable for polymerization to a high molecular weight polymer which comprises (i) depolymerizing a low molecular weight polymer of formaldehyde by heating it in the presence of methylene diacetate containing a catalytic amount of phosphoric acid, at a temperature in the range between 130° C. and 160° C., and (ii) recovering substantially anhydrous, gaseous, monomeric formaldehyde having a purity of at least 99.9 percent by weight from the depolymerization medium.

7. The process for producing substantially anhydrous, gaseous, monomeric formaldehyde suitable for polymerization to a high molecular weight polymer which comprises (i) depolymerizing α-polyoxymethylene by heating it in the presence of methylene diacetate containing a catalytic amount of phosphoric acid, at a temperature in the range between 130° C. and 160° C., and (ii) recovering substantially anhydrous, gaseous, monomeric formaldehyde having a purity of at least 99.9 percent by weight from the depolymerization medium.

8. The process for producing substantially anhydrous, gaseous, monomeric formaldehyde suitable for polymerization to a high molecular weight polymer which comprises (i) depolymerizing a polyoxymethylene glycol having a molecular weight in the range from about 2,000 to about 6,000 and containing not more than 0.1 percent by weight of water by heating it in the presence of methylene diacetate containing a catalytic amount of phosphoric acid, at a temperature in the range between 130° C. and 160° C., and (ii) recovering substantially anhydrous, gaseous, monomeric formaldehyde having a purity of at least 99.9 percent by weight from the depolymerization medium.

References Cited by the Examiner

UNITED STATES PATENTS 3,162,240  12/1964  Wagner _____ 260—606

FOREIGN PATENTS 467,405  8/1950  Canada.
625,050  8/1961  Canada.
949,331  2/1964  Great Britain.

LEON ZITVER, *Primary Examiner.*

J. J. SETELIK, R. H. LILES, *Assistant Examiners.*